US012600504B2

(12) United States Patent
Jamolli et al.

(10) Patent No.: US 12,600,504 B2
(45) Date of Patent: Apr. 14, 2026

(54) VTOL UAV WITH 3D LIDAR SENSOR

(71) Applicant: FLYABILITY SA, Lausanne (CH)

(72) Inventors: Kevin Jamolli, Pully (CH); Romain Conti, Epalinges (CH); Stefano Zampieri, Lausanne (CH); Ludovic Daler, Chardonne (CH); Adrien Briod, Lausanne (CH)

(73) Assignee: FLYABILITY SA, Lausanne (CH)

( * ) Notice: Subject to any disclaimer, the term of this patent is extended or adjusted under 35 U.S.C. 154(b) by 0 days.

(21) Appl. No.: 18/866,902

(22) PCT Filed: May 15, 2023

(86) PCT No.: PCT/EP2023/062867
§ 371 (c)(1),
(2) Date: Nov. 18, 2024

(87) PCT Pub. No.: WO2023/222560
PCT Pub. Date: Nov. 23, 2023

(65) Prior Publication Data
US 2025/0304295 A1     Oct. 2, 2025

(30) Foreign Application Priority Data

May 18, 2022     (EP) ..................................... 22173929

(51) Int. Cl.
*B64U 20/87*       (2023.01)
*B64U 10/14*       (2023.01)
(Continued)

(52) U.S. Cl.
CPC ............. *B64U 20/87* (2023.01); *B64U 10/14* (2023.01); *B64U 30/26* (2023.01); *B64U 30/299* (2023.01); *G01S 17/933* (2013.01)

(58) Field of Classification Search
CPC ........ B64U 20/87; B64U 10/14; B64U 30/26; B64U 30/299; B64U 20/77; B64U 2201/00; G01S 17/933; G01S 17/86; G01S 7/4813
See application file for complete search history.

(56) References Cited

U.S. PATENT DOCUMENTS 7,149,611 B2 * 12/2006 Beck ...................... B64U 30/26
                                                          701/32.4
9,828,095 B1 * 11/2017 Wilcox .................. B64U 50/13
                      (Continued)

FOREIGN PATENT DOCUMENTS

CN        212685901 U    3/2021
EP         3450310 A1    3/2019
                  (Continued)

OTHER PUBLICATIONS

European Patent Office, International Search Report and Written Opinion for PCT Application No. PCT/ EP2023/062867, mail date Aug. 8, 2023.

*Primary Examiner* — Medhat Badawi
(74) *Attorney, Agent, or Firm* — SoCal IP Law Group LLP; Angelo Gaz

(57) ABSTRACT
A VTOL UAV comprising a chassis, a propulsion system mounted on the chassis, electronics including a flight control system, and a 3D LIDAR sensor mounted on the chassis. The 3D LIDAR sensor has a laser beam 360° rotation axis (R) and an azimuthal scanning angle ($\alpha$) in a range of 70° to 110°. The propulsion system comprises a plurality of propellers with motors configured for flight without wings, including static hovering flight, the VTOL UAV comprising a yaw axis (Z) about which it can rotate upon itself. The 3D LIDAR sensor is statically mounted on the chassis such that the LIDAR laser beam 360° rotation axis (R) is inclined at
(Continued)

a LIDAR inclination angle ($\beta$) with respect to the yaw axis (Z) in a range of 35° to 50°.

17 Claims, 7 Drawing Sheets

(51) Int. Cl.

| | |
|---|---|
| *B64U 30/26* | (2023.01) |
| *B64U 30/299* | (2023.01) |
| *G01S 17/933* | (2020.01) |

(56) References Cited

U.S. PATENT DOCUMENTS

| | | | | |
|---|---|---|---|---|
| 10,457,390 | B2 * | 10/2019 | McCullough | B64D 1/08 |
| 10,988,241 | B2 * | 4/2021 | Santangelo | B64C 25/58 |
| 11,708,160 | B2 * | 7/2023 | Briod | B64U 30/24 |
| | | | | 244/17.23 |
| 11,738,613 | B1 * | 8/2023 | Spikes | B60B 19/02 |
| | | | | 244/2 |
| 11,783,465 | B2 * | 10/2023 | Dominguez | B64U 10/13 |
| | | | | 348/144 |
| 11,892,560 | B2 * | 2/2024 | Yu | G01S 17/86 |
| 12,134,488 | B2 * | 11/2024 | Sidoti | A63H 27/12 |
| 12,384,536 | B2 * | 8/2025 | Jia | B64U 10/14 |
| 12,404,045 | B2 * | 9/2025 | Zampieri | G01N 29/225 |
| 2014/0131507 | A1 * | 5/2014 | Kalantari | B60F 5/02 |
| | | | | 244/2 |
| 2015/0360776 | A1 * | 12/2015 | Briod | B64C 17/00 |
| | | | | 244/23 A |
| 2016/0001875 | A1 * | 1/2016 | Daler | B64U 10/13 |
| | | | | 244/17.11 |
| 2016/0376004 | A1 * | 12/2016 | Claridge | B64C 19/00 |
| | | | | 701/3 |
| 2017/0050726 | A1 * | 2/2017 | Yamada | B64U 60/60 |
| 2017/0233072 | A1 * | 8/2017 | Chang | B64U 50/18 |
| | | | | 244/2 |
| 2017/0291697 | A1 * | 10/2017 | Kornatowski | B64U 30/293 |
| 2018/0002009 | A1 * | 1/2018 | Mccullough | B64C 29/0033 |
| 2018/0170533 | A1 * | 6/2018 | Lee | B64U 30/21 |
| 2018/0170539 | A1 * | 6/2018 | Claridge | A63H 27/12 |
| 2019/0310355 | A1 * | 10/2019 | Kerr | B64U 10/13 |
| 2019/0322362 | A1 * | 10/2019 | Santangelo | B64C 25/58 |
| 2020/0189712 | A1 * | 6/2020 | Briod | B64U 10/13 |
| 2021/0061463 | A1 * | 3/2021 | Briod | B64U 30/24 |
| 2021/0239793 | A1 * | 8/2021 | Yu | G01S 7/40 |
| 2022/0083061 | A1 * | 3/2022 | Xie | G05D 1/106 |
| 2022/0097865 | A1 * | 3/2022 | Sidoti | A63H 27/12 |
| 2023/0408651 | A1 * | 12/2023 | Shepard | G01S 17/86 |
| 2024/0045033 | A1 * | 2/2024 | Roszko | G01P 3/48 |
| 2024/0053480 | A1 * | 2/2024 | Blasch | G01S 17/86 |
| 2024/0425210 | A1 * | 12/2024 | Zampieri | B64C 27/006 |
| 2025/0304295 | A1 * | 10/2025 | Jamolli | G01S 17/86 |

FOREIGN PATENT DOCUMENTS

| | | | |
|---|---|---|---|
| WO | 2021/087703 | A1 | 5/2021 |
| WO | 2023/222560 | A1 | 11/2023 |

* cited by examiner

VTOL UAV WITH 3D LIDAR SENSOR

RELATED APPLICATION INFORMATION

This patent claims priority from International PCT Patent Application No. PCT/EP2023/062867, filed May 15, 2023 entitled, "VTOL UAV WITH 3D LIDAR SENSOR", which claims priority to European Patent Application No. EP22173929.5, filed May 18, 2022 all of which are incorporated herein by reference in their entirety.

FIELD OF THE INVENTION

The present invention relates to a vertical take-off and landing (VTOL) unmanned aerial vehicle (UAV) with a light detection and ranging (LIDAR) sensing system.

BACKGROUND OF THE INVENTION

It is known to provide vehicles including UAVs (also known as drones) with LIDAR sensing systems that use light in the form of a pulsed laser to measure ranges to objects in the environment of the sensor. This may be used for instance for guiding moving vehicles and avoiding collision with objects in the travel direction of the vehicle, or simply for mapping the 3D space around the UAV. The LIDAR sensor may also be used for scanning and mapping objects and structures around the UAV.

There are several popular types of LIDARs:

1D LIDAR: One laser beam measurement in a single direction;

Scanning 2D LIDAR: One laser beam continuously executing 360° rotations within a plane, providing a scan within this plane, namely a 2D scan with a "horizontal field of view" of 360° (or less if there are some obstructions, but usually 270° or more);

Scanning 3D LIDAR: multiple laser beams or sensor arrays enabling range sensing towards different orientations (usually spread within an angle ranging from 15° to 95°), continuously executing 360° rotations, providing a 3D scan with a 360° horizontal field of view and 15 to 95° vertical field of view;

Flash LIDAR: in this case, the entire field of view is illuminated with a wide diverging laser beam in a single pulse. A solid state sensing array collects 3-D range data over a field of view generally defined by a lens (similar to a standard camera).

As mentioned above, typical scanning 3D LIDARs may have a rotating laser beam rotating 360° around the axis of rotation and typically a scanning angle of 15 to 95° with respect to the vertical axis. In order to increase the scanning volume around the UAV, it is known to mount the LIDAR on a motorized moving mechanism. However, for VTOL UAVs, such moving mechanisms require additional motors and structural mechanisms that increase the weight and cost of the UAV. Since weight is a key factor in the flight performance and autonomy of a UAV, such mechanisms represent an important drawback in the use of movable LIDAR sensing arrangements. Moreover, despite the presence of movable mechanisms, the propulsion system and elements of the drone block a portion of the LIDAR sensing volume.

SUMMARY OF THE INVENTION

In view of the foregoing, it is an object of the invention to provide a VTOL UAV with a LIDAR sensing system that is lightweight, yet able to easily scan the surrounding volume horizontally and vertically (e.g to obtain a spherical scanning range). In particular for indoor LIDAR surveys, where objects of interest can be in all directions around the UAV.

It is advantageous to provide a VTOL UAV that is cost effective to manufacture and operate.

It is advantageous to provide a VTOL UAV that is safe and well protected from impacts with objects.

A particular object of the invention is to provide a VTOL UAV for inspection applications that can operate safely and effectively in confined or indoor environments.

It is advantageous to provide a VTOL UAV for inspection purposes that is compact.

It is advantageous to provide a VTOL UAV for inspection purposes that has a high flight autonomy.

It is advantageous to provide a VTOL UAV for inspection purposes in indoor environments that is robust and durable.

Objects of this invention have been achieved by providing the VTOL UAV according to descriptions herein.

Disclosed herein is a VTOL UAV comprising a chassis, a propulsion system mounted on the chassis, electronics including a flight control system, and a 3D LIDAR sensor mounted on the chassis. The 3D LIDAR sensor has a laser beam 360° rotation axis (R) and a scanning angle with respect to the LIDAR rotation axis (named herein an azimuthal scanning angle) ($\alpha$) in a range of 70° to 110°, the propulsion system comprising a plurality of propellers with motors configured for flight without wings, including static hovering flight, the VTOL UAV comprising a yaw axis (Z) about which it can rotate upon itself.

The 3D LIDAR sensor is statically mounted on the chassis such that the LIDAR laser beam 360° rotation axis (R) is inclined at a LIDAR inclination angle ($\beta$) with respect to the yaw axis (Z) in a range of 35° to 50°.

In an advantageous embodiment, the LIDAR inclination angle ($\beta$) is 45° or in a range of 43° to 47°.

In an advantageous embodiment, the LIDAR sensor is mounted within an orifice in a centre part of the chassis, a pair of motors at a back side of the UAV being at a height in the direction of the yaw axis that is different to a height of a second pair of motors positioned on a front side of the VTOL UAV.

In an advantageous embodiment, the chassis comprises a centre part and branches extending radially outwards from the centre part with respect to the yaw axis (Z), the propellers being mounted at ends of said branches.

In an advantageous embodiment, the propulsion system comprises at least three non-coaxially spaced apart propellers, preferably four non-coaxially spaced apart propellers, the 3D LIDAR sensor being mounted between propellers.

In an advantageous embodiment, the propulsion system comprises fan ducts surrounding each of the propellers.

In an advantageous embodiment, the propulsion system comprises four propellers, consisting of a pair of back propellers having rotation axes spaced apart by a spacing (Lb) and a pair of front propellers having rotation axes spaced apart by a spacing (Lf), the back propeller spacing (Lb) being greater than the front propeller spacing (Lf), the LIDAR sensor being mounted between the pair of back propellers.

In an advantageous embodiment, the LIDAR sensor is mounted on the chassis via a mounting bracket, the LIDAR being removably coupled to the chassis via the mounting bracket.

In an advantageous embodiment, each propeller has a propeller centre axis (C), at least two of the propellers having the propeller centre axis (C) having a propeller inclination angle (γ) with respect to the yaw axis (Z) that is in a range of 1° to 10°, preferably in a range of 2° to 8°.

In an advantageous embodiment, the inclined propeller centre axes diverge on a top side of the UAV and converge on a bottom side of the UAV.

In an advantageous embodiment, the VTOL UAV further comprises an outer protective cage surrounding the chassis, the outer protective cage comprising a plurality of beams interconnected to each other and surrounding the chassis.

In an advantageous embodiment, the outer protective cage comprises a front side with an opening greater than openings formed by the interconnected beams around the top, bottom, sides and back of the UAV, the front side opening configured for access to a battery removably mounted to the chassis within the outer protective cage.

In an advantageous embodiment, the VTOL UAV further comprises an image capture system and optionally a lighting system and other sensors mounted on a front side of the UAV at the opening in the outer protective cage surrounding the chassis.

In an advantageous embodiment, the azimuthal scanning angle (α) of the 3D LIDAR is in a range of 85° to 95°.

In an advantageous embodiment, the flight control system comprises a module configured to automatically maintain a constant rate of rotation of the VTOL UAV about the yaw axis to ensure a homogeneous scan.

Further objects and advantageous aspects of the invention will be apparent from the descriptions herein, and from the following detailed description and accompanying figures.

BRIEF DESCRIPTION OF THE DRAWINGS

FIG. 1b is an exploded perspective view of the embodiment of FIG. 1a;

FIG. 2a is a side view of the embodiment of FIG. 1a;

FIG. 2b is a top view of the embodiment of FIG. 1a;

FIG. 2c is a front view of the embodiment of FIG. 1a;

FIG. 2d is a back view of the VTOL UAV embodiment of FIG. 1a;

FIG. 3a is a top view of the VTOL UAV of FIG. 1a with an outer protective cage removed;

FIG. 3b is a side view of the embodiment of FIG. 3a;

FIG. 4a is a perspective view of a VTOL UAV according to another embodiment of the invention;

FIG. 4b is a side view of the embodiment of FIG. 4a;

FIG. 5a is a view of the embodiment of FIG. 4a with the outer protective cage removed;

FIG. 5b is a side view of the embodiment of FIG. 5a.

DETAILED DESCRIPTION OF THE INVENTION

Figure 1A:
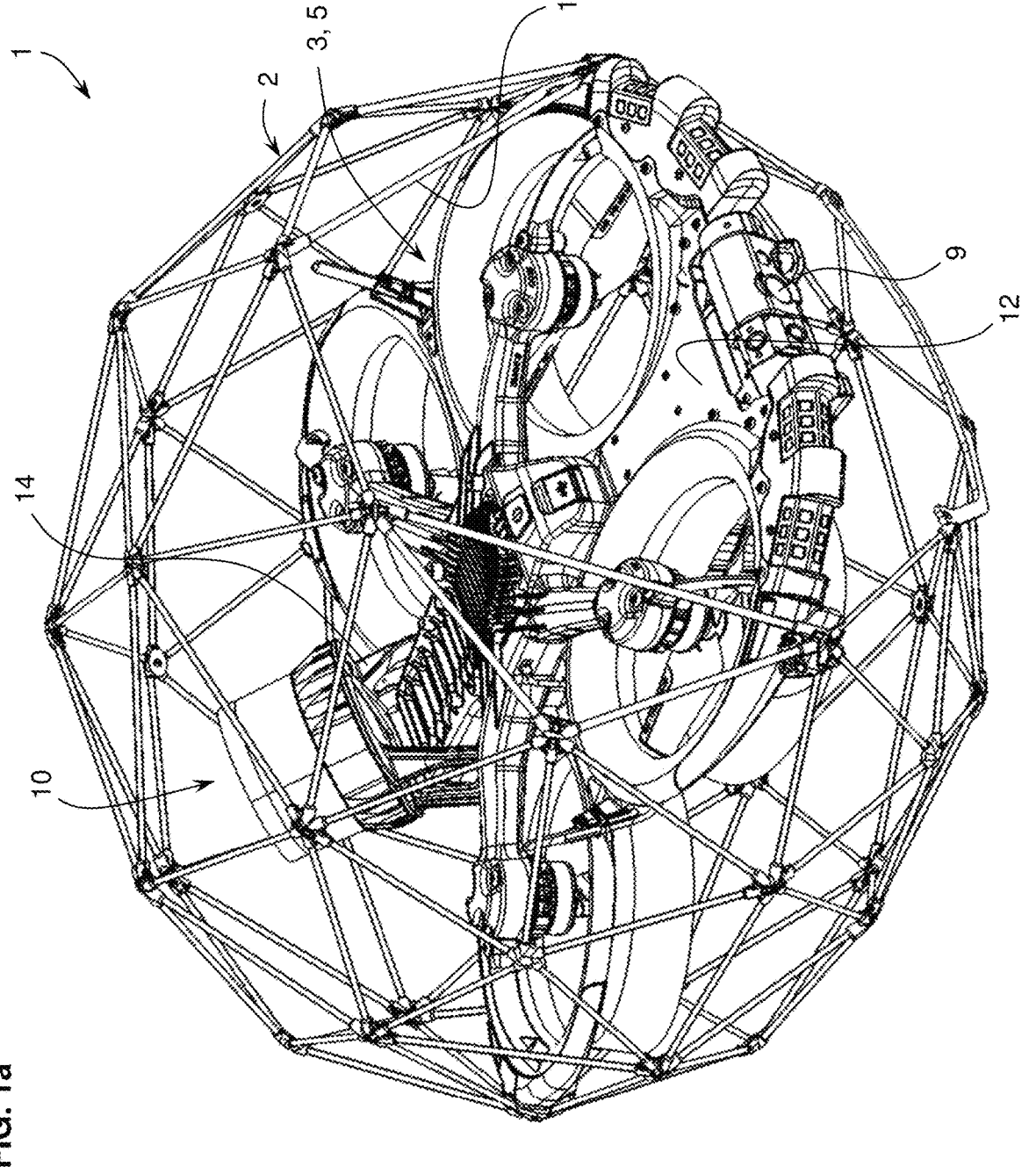
FIG. 1a is a perspective view of a VTOL UAV according to an embodiment of the invention.
Figure 1B:
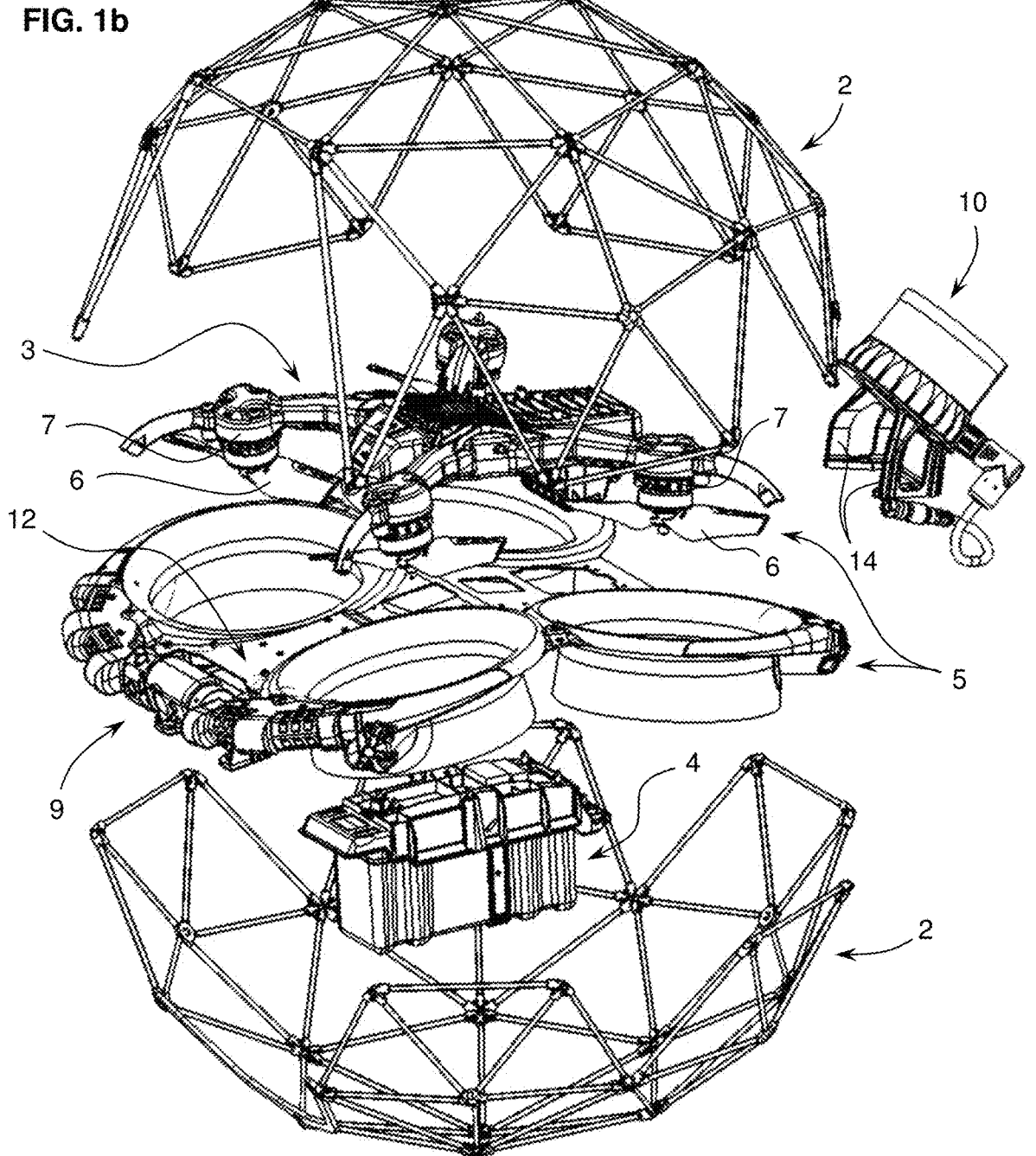
Figures 2A, 2B:
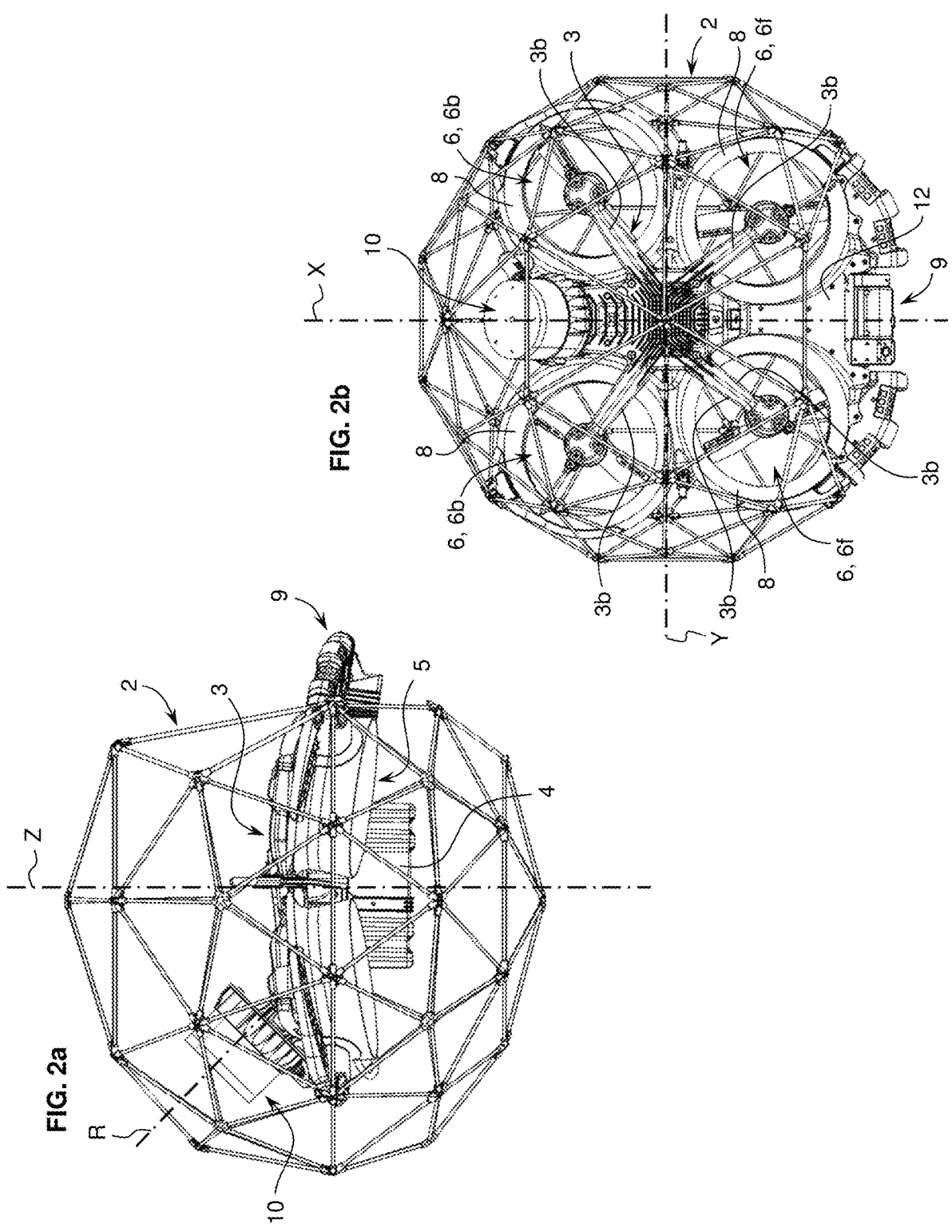
Figures 2C, 2D:
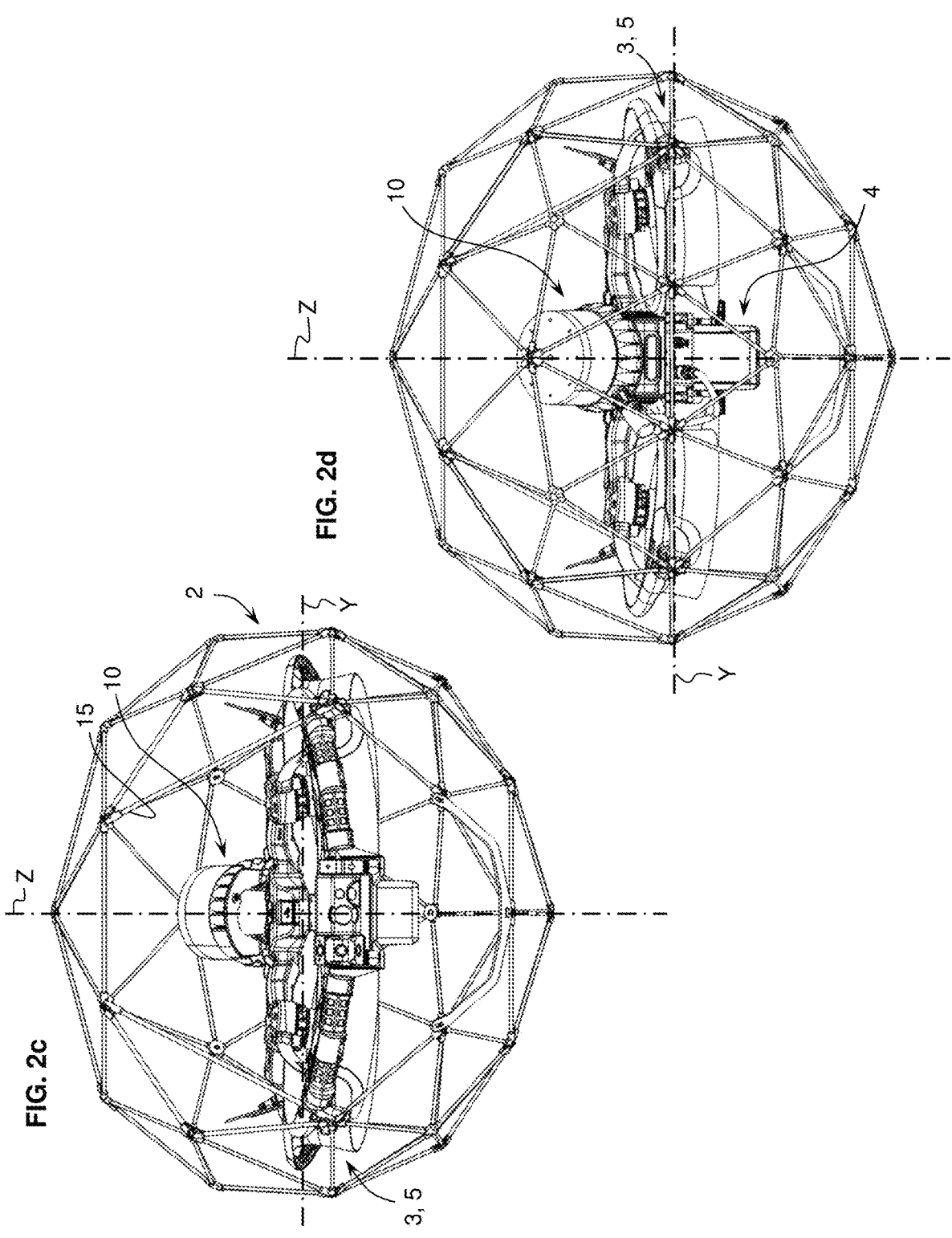

Referring to the figures, a VTOL UAV 1 according to embodiments of this invention comprises a protective outer cage 2, a chassis 3 coupled to the protective outer cage and mounted within the protective outer cage, a power source 4 for instance in the form of a battery mounted to and supported by the chassis, a propulsion system 5 mounted to and supported by the chassis, and an electronics unit 12 mounted to and supported by the chassis.

The VTOL UAV further comprises a sensing system including a 3D LIDAR sensor 10.

The VTOL UAV may comprise further sensors and inspection devices such as an image capture system 9.

The electronics unit 12 includes electronics to control the propulsion system for flight control, and for other operations such as wireless communication with other devices, processing measurement and sensing data, navigation, and various functions per se known in VTOL UAVs.

In a preferred embodiment, the protective outer cage 2 is formed of beams interconnected together to form a substantially ball shaped cage surrounding the chassis and propulsion system, such structures being per se known. The electronics unit and power source may be mounted to the chassis well protected within the outer protective cage and by the chassis. The image capture system 9 and projection lights and other sensors may be mounted on one side of the protective cage with a cage opening 15 that is larger than the openings between the thin beams interconnected together forming the remainder of the cage. This opening 15 may also be used to facilitate the removal and insertion of the battery or other payloads to be mounted on the chassis within the outer protective cage. The mounting of the image capture system and projection lights at the opening 15 allows for an uninterrupted wide angle of view for the image capture system.

In a preferred embodiment, the propulsion system comprises a plurality of propellers 6 each comprising propeller blades 13 coupled to a motor 7.

In a preferred embodiment, the propulsion system comprises four propellers 6 arranged around a yaw axis Z of the UAV. The propellers are arranged around the yaw axis such that they can lift the VTOL UAV in a vertical direction parallel to the yaw axis Z and keep the VTOL UAV in static (hovering) stable flight with the yaw axis aligned with the vertical direction. Perpendicular to the yaw axis Z, the VTOL UAV comprises what one may consider to be a pitch axis Y and a roll axis X. The positions of the pitch and roll axes may be defined relative to an orientation UAV which is given by an image sensor 9 corresponding to a front of the UAV. An opposite side of the UAV from the front may be defined by convention as a back of the UAV. A horizontal plane XY may be defined as a plane orthogonal to the yaw axis Z when the UAV is in a static stable flight position, in which case the UAV should have its yaw axis Z parallel to a vertical direction and its horizontal plane XY parallel to the horizontal direction.

Each propeller 6 has a propeller centre axis C that may be parallel or substantially parallel to the yaw axis Z, or in preferred embodiments the propeller centre axis C may have an inclination angle γ that is preferably within 1-10°, preferably between 2 and 8° with respect to the yaw axis Z. The propeller centre axes are inclined such that they diverge above the propellers and converge below the propellers, such arrangement enabling to provide greater flight stability at low speeds and easier flight control. The motors 7 of each propeller are preferably independently controlled by a propulsion control unit of the electronics 12.

The chassis 3 according to an advantageous embodiment, comprises a centre part 3a and branches 3b extending outwardly therefrom to ends of the branches on which the motors 7 of the propellers 6 are mounted. Each of the propellers 6 may further comprise a fan duct 8 surrounding the tip of the propeller blades 13, such fan duct and propeller arrangements being per se well known and configured to improve the aerodynamics of the propulsion system. The fan ducts 8 may be fixed to the chassis and form part of the chassis, providing structural resistance to the chassis.

In an advantageous embodiment, the motors 7 of the front propellers 6f at a front side of the UAV are spaced apart by a spacing Lf (front motor spacing) that is smaller than a spacing Lb (back motor spacing) of the motors of the back propellers 6*b*. This configuration provides better scanning beam access for the 3D LIDAR sensor 10 mounted on the chassis between the pair of branches at a back side of the UAV.

According to an aspect of the invention, the 3D LIDAR sensor 10 comprises a laser beam or plurality of laser beams rotating 360° about a laser beam rotation axis R. The 360° rotating laser beam(s) also comprise an azimuthal scanning angle α of 70° to 110° relative to the rotating laser centre axis R, typically of about 85° to 95° for instance of about 90°. The inclination angle β of the LIDAR with respect to the yaw axis Z is in a range of 40 to 50°, preferably 45° or about 45° with respect to the yaw axis. The 3D LIDAR sensor 10 is fixedly coupled to the chassis 3, for instance fixedly coupled directly to the chassis or via a mounting bracket 14. The term "azimuthal scanning angle" as used herein refers to the scanning angle with respect the rotation axis R of the LIDAR beam. This term may be also be expressed as "scanning angle with respect to the rotation axis R".

In an advantageous embodiment, the mounting bracket may be configured to allow releasable coupling of the 3D LIDAR sensor to the chassis such that the LIDAR sensor may be removed for maintenance, replacement, or for operation of the UAV without a LIDAR in circumstances that do not require the LIDAR.

Figures 3A, 3B:
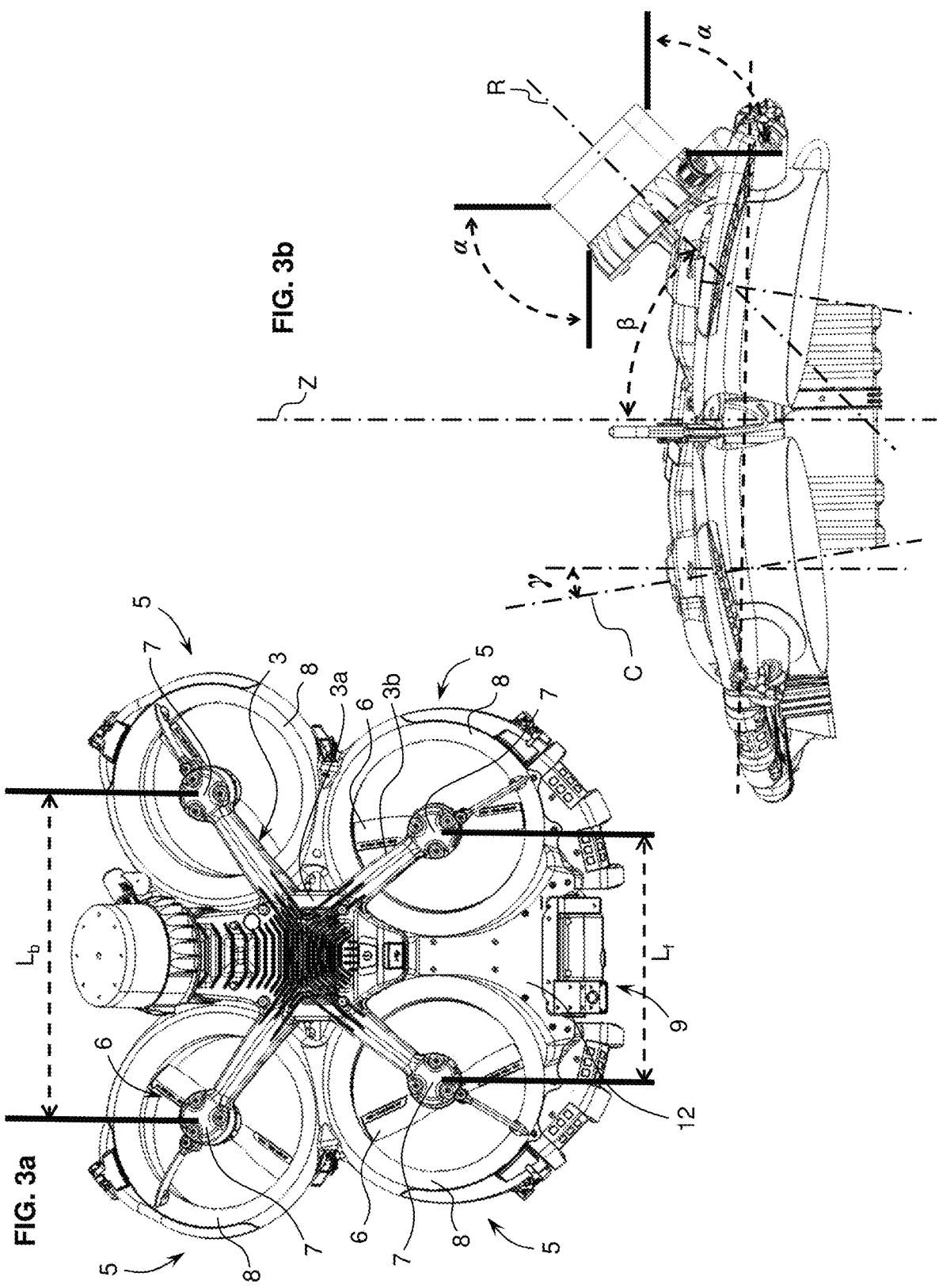
Figures 4A, 4B:
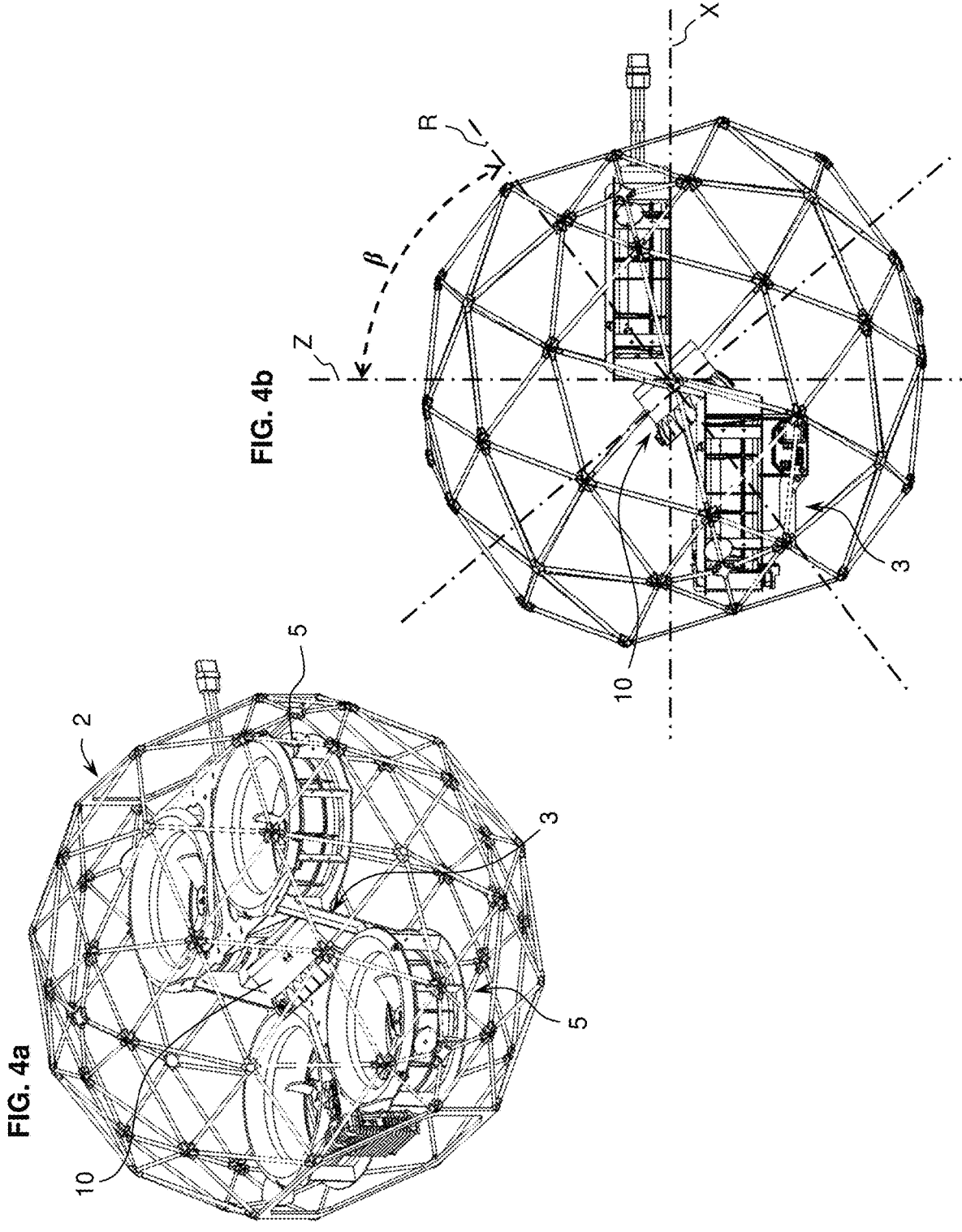
Figures 5A, 5B:
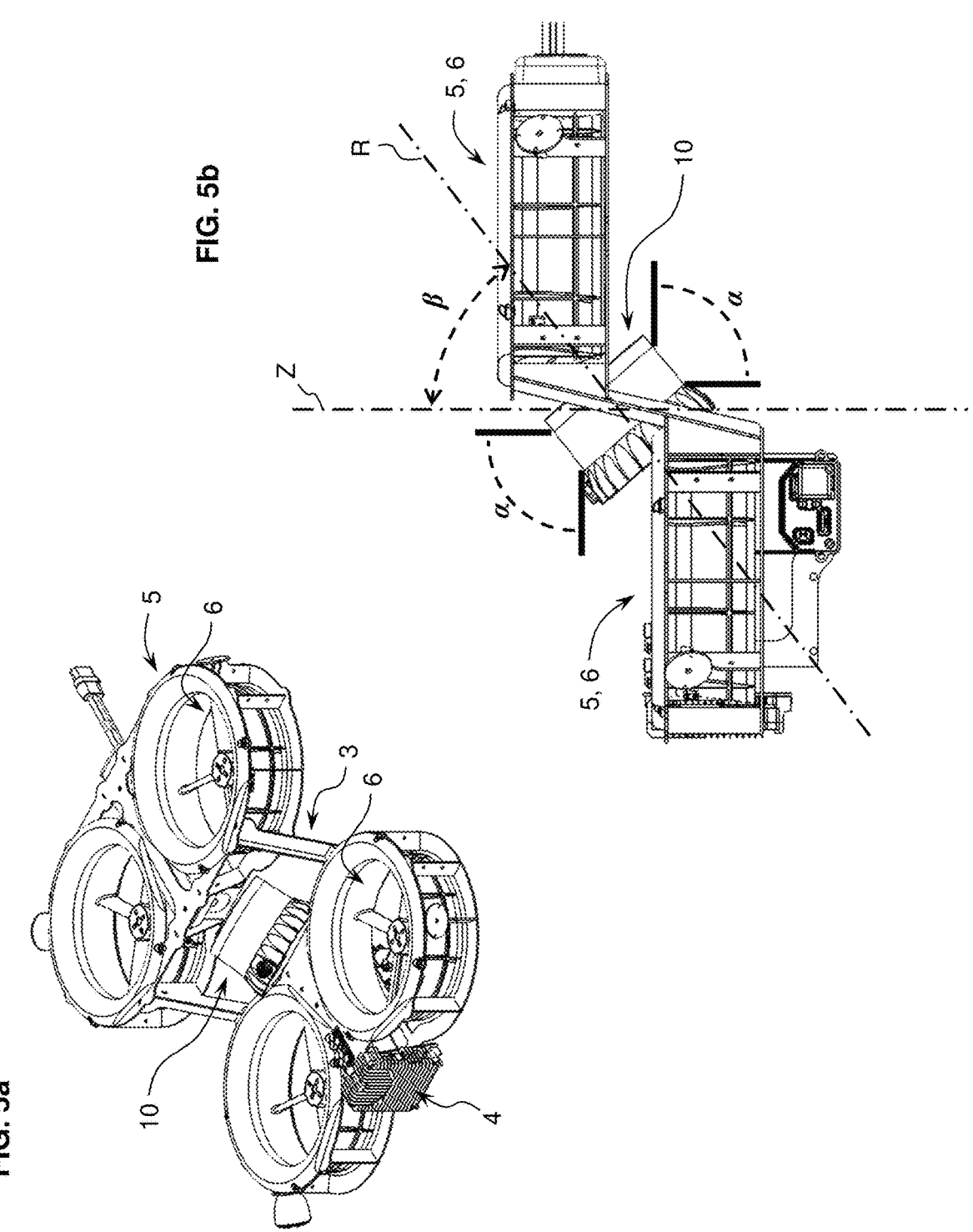

As best seen in FIG. 3*b*, the scanning range of the LIDAR with its axis at or approximately at 45° with respect to the yaw axis Z (i.e. β=45°), allows a scanning range from at least a vertical to a horizontal position, and by operating the UAV to rotate around its yaw axis Z by 90° or more, the entire spherical volume around the UAV may be scanned with the 3D LIDAR sensor 10.

Since the 3D LIDAR sensor 10 may be fixed statically to the chassis, the additional weight for the LIDAR system may be kept to a minimum (in particular by removing the need for a motorized moving mechanism), yet the entire 360° spherical degrees around the UAV may be scanned by rotating the drone 360° around its yaw axis Z. In such operation, the UAV may remain in a static hovering position and thus be in a confined environment when performing the scanning function. In other words, while rotating the UAV about its yaw axis Z, no additional space or volume in the environment of the UAV is required for the LIDAR scanning function. The VTOL UAV can thus easily scan the entire 3d environment around the UAV avoiding unscanned dead zones.

The flight control system of the electronics 12 may comprise a software module configured to control the flight of the UAV in coordination with the scanning operation. For instance, the module may be configured to automatically maintain a constant rotation rate of the UAV around its yaw axis for a partial e.g. 90° or full e.g. 360° rotation or more to ensure a homogeneous scan of the surroundings. The control system may be used to automatically fly the UAV through an environment, while maintaining a constant yaw rotation rate during the course of long flight sections.

In an alternative embodiment as illustrated in FIGS. 4*a* to 5*b*, the chassis may comprise a hollow centre part frame 3*a* having a central opening in which the 3D LIDAR sensor 10 is fixedly mounted at an inclination angle β of the LIDAR 360° rotation axis R with respect to the yaw axis Z which is in a range of 40 to 50°, preferably 45° or about 45°. In this embodiment, the pairs of propellers at the front 6*f* and in the back 6*b* are offset O in the direction of the yaw axis such that they are substantially aligned on different horizontal planes.

The latter configuration gives access to the LIDAR laser beam to scan over at least 90° from the yaw axis Z to the horizontal plane XY without interference by the propulsion system.

LIST OF FEATURE REFERENCES

Vertical Take-Off and Landing Unmanned Aerial Vehicle (VTOL UAV) 1
  Protective outer cage 2
    Front opening 15
  Chassis 3
    Centre part 3*a*
    Branches 3*b*
  Power source (battery) 4
  Propulsion system 5
    Propellers 6
      Front propellers 6*f*
      Back propellers 6*b*
    Motors 7
    Fan Ducts 8
  Sensing system
  Image capture system 9
  3D Light detection and ranging (LIDAR) sensor 10
    Mounting bracket 14
  Electronics 12
    Flight control system
  Yaw axis Z
  Pitch axis Y
  Roll axis X
  Horizontal plane XY
  Propeller centre axis C
  Propeller inclination angle γ
  LIDAR axis R
  LIDAR inclination angle β
  LIDAR azimuthal scanning angle (scanning angle with respect to the LIDAR rotation axis) α
  Front motor spacing Lf
  Back motor spacing Lb

The invention claimed is:

1. A VTOL UAV comprising a chassis, a propulsion system mounted on the chassis, electronics including a flight control system, and a 3D LIDAR sensor mounted on the chassis, the 3D LIDAR sensor has a laser beam 360° rotation axis (R) and an azimuthal scanning angle (α) in a range of 70° to 110°, the propulsion system comprising a plurality of propellers with motors configured for flight without wings, including static hovering flight, the VTOL UAV comprising a yaw axis (Z) about which the VTOL UAV is operable to rotate during flight, wherein the 3D LIDAR sensor is statically mounted on the chassis such that the LIDAR laser beam 360° rotation axis (R) is inclined at a LIDAR inclination angle (β) with respect to the yaw axis (Z) in a range of 35° to 50°.

2. The VTOL UAV according to claim 1 wherein the LIDAR inclination angle (β) is in a range of 43° to 47°.

3. The VTOL UAV according to claim 1 wherein the LIDAR sensor is mounted within an orifice in a centre part of the chassis, the VTOL UAV further comprising a pair of motors at a back side of the UAV at a height in the direction of the yaw axis that is different to a height of a second pair of motors positioned on a front side of the VTOL UAV.

4. The VTOL UAV according to claim 1 wherein the chassis comprises a centre part and branches extending radially outwards from the centre part with respect to the yaw axis (Z), wherein the propellers are mounted at ends of said branches.

5. The VTOL UAV according to claim 1 wherein the propulsion system comprises at least three non-coaxially spaced apart propellers, preferably four non-coaxially spaced apart propellers, wherein the 3D LIDAR sensor is mounted between propellers.

6. The VTOL UAV according to claim 1 wherein the propulsion system comprises fan ducts surrounding each of the propellers.

7. The VTOL UAV according to claim 1 wherein the propulsion system comprises four propellers, consisting of a pair of back propellers having rotation axes spaced apart by a spacing (Lb) and a pair of front propellers having rotation axes spaced apart by a spacing (Lf), wherein the back propeller spacing (Lb) is greater than the front propeller spacing (Lf), wherein the LIDAR sensor is mounted between the pair of back propellers.

8. The VTOL UAV according to claim 1 wherein the LIDAR sensor is mounted on the chassis via a mounting bracket, wherein the LIDAR is removably coupled to the chassis via the mounting bracket.

9. The VTOL UAV according to claim 1 wherein each propeller has a propeller centre axis (C), at least two of the propellers having the propeller centre axis (C) having a propeller inclination angle ($\gamma$) with respect to the yaw axis (Z) that is in a range of 1° to 10°.

10. The VTOL UAV according to claim 9 wherein the inclined propeller centre axes diverge on a top side of the UAV and converge on a bottom side of the UAV.

11. The VTOL UAV according to claim 1 further comprising an outer protective cage surrounding the chassis, the outer protective cage comprising a plurality of beams interconnected to each other and surrounding the chassis.

12. The VTOL UAV according to claim 11 wherein the outer protective cage comprises a front side with an opening greater than openings formed by the interconnected beams around the top, bottom, sides and back of the UAV, the opening configured for access to a battery removably mounted to the chassis within the outer protective cage.

13. The VTOL UAV according to claim 1 further comprising an image capture system and optionally a lighting system and other sensors mounted on a front side of the UAV at an opening in an outer protective cage surrounding the chassis.

14. The VTOL UAV according to claim 1 wherein the 3D LIDAR comprises an azimuthal scanning angle ($\alpha$) in a range of 85° to 95°.

15. The VTOL UAV according to claim 1 wherein the flight control system comprises a module configured to automatically maintain a constant rate of rotation of the VTOL UAV about the yaw axis to ensure a homogeneous scan.

16. The VTOL UAV according to claim 1 wherein each propeller has a propeller centre axis (C), at least two of the propellers having the propeller centre axis (C) having a propeller inclination angle ($\gamma$) with respect to the yaw axis (Z) that is in a range of 2° to 8°.

17. The VTOL UAV according to claim 1 wherein the LIDAR inclination angle ($\beta$) is 45°.

\* \* \* \* \*